(No Model.)
O. JUNKERMAN.
PUMP.
No. 347,112. Patented Aug. 10, 1886.
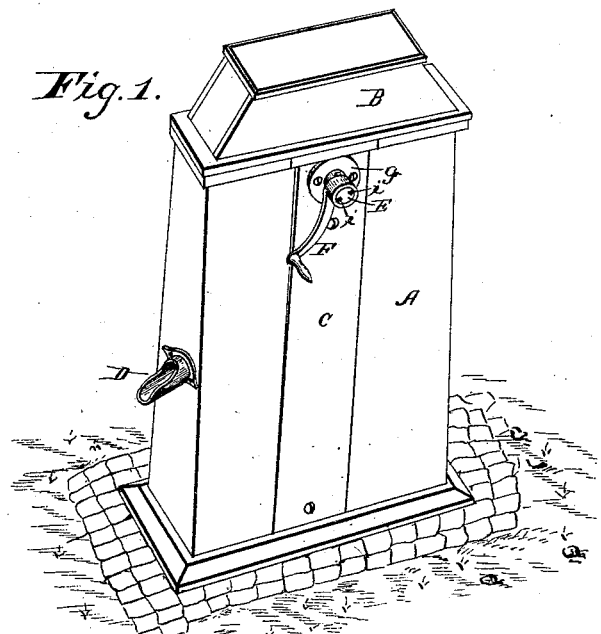
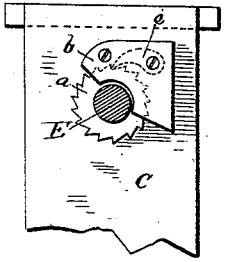
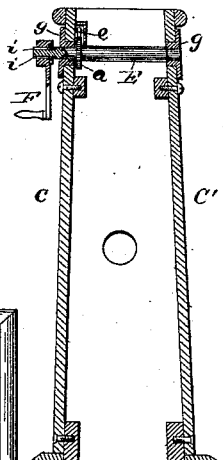
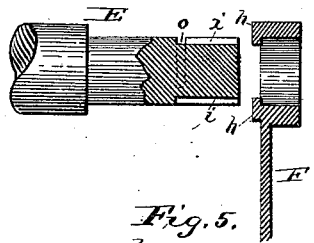
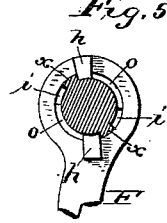
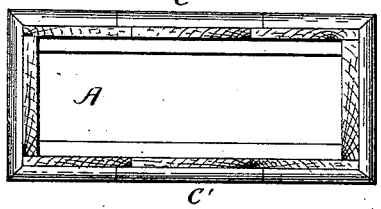
WITNESSES
C. D. Davis
W. J. Alexander
INVENTOR
O. Junkerman
By C. M. Alexander
Attorney
N. PETERS. Photo-Lithographer, Washington. D. C.

UNITED STATES PATENT OFFICE.

OTTO JUNKERMAN, OF CENTRALIA, ILLINOIS.

PUMP.

SPECIFICATION forming part of Letters Patent No. 347,112, dated August 10, 1886.

Application filed May 21, 1886. Serial No. 202,877. (No model.)

*To all whom it may concern:*

Be it known that I, OTTO JUNKERMAN, a citizen of the United States, residing at Centralia, in the county of Marion and State of Illinois, have invented certain new and useful Improvements in Pumps, of which the following is a specification, reference being had therein to the accompanying drawings.

My invention relates to well-curbs and attachments to be used in connection with chain-pumps for elevating water, and the object I have in view is to produce a curb with removable panels, either horizontal or vertical, to which are connected a reel, ratchet, and handle of peculiar construction, as will be hereinafter more fully set forth.

In the accompanying drawings, making part of this specification, Figure 1 represents a perspective view; Fig. 2, a longitudinal cross-section; Fig. 3, a face view of a portion of one of the panels, with ratchet-wheel ratchet-tooth in dotted line, and shaft in cross-section; Fig. 4, a portion of the shaft, partly in section, with handle in section; Fig. 5, a view of portion of handle and shaft, and Fig. 6 a plan view of curb with top and gearing removed.

In the figures, A represents a well-curb, which consists of a suitable frame boarded in and provided with a suitable removable cover, B. This curb is provided on each side with a removable panel, C C'. These panels may be either vertical, as represented, or crosswise or horizontal, as may be desired.

The object of having the panels removable is mainly to be able at pleasure to reach the interior of the curb for the purpose of repairing the apparatus contained therein. Another object is to enable to reach and properly regulate the gearing which operates the chain.

Secured in each of the removable panels are the bearing-thimbles $g\,g$, which are flanged, as seen, and through which flanges they are secured to the panels.

E represents a shaft, which is provided with shoulders near each end, and which lies crosswise of the curb, having its bearings in the thimbles $g\,g$.

Secured to the shaft E and within the curb is a ratchet-wheel, $a$, which is partially covered by a hood, $b$. Within this hood and secured to the panel C is a pawl or ratchet, $e$, which catches in the teeth of the wheel $a$, allowing it to turn in only one direction.

That end of the shaft E to which the handle is attached is provided on opposite sides with longitudinal grooves $i\,i$, which terminate in a partially-circumferential groove, $o$, said groove having two stops in it, (marked $x\,x$,) but out of the line of the grooves $i\,i$.

F represents the handle, which passes over the end of the shaft, and which is provided on its inner face with two lugs, $h\,h$, which are intended to pass into the grooves $i\,i$ first and then into the groove $o$. When this handle is turned partially around, the lugs $h\,h$ turn with it until they catch against the stops $x\,x$. These stops arrest the progress of the handle, and station it (in moving in that or a forward direction) upon the shaft E.

The handle may be readily removed by reversing the direction of its movement and allowing its lugs to pass out of the grooves in the shaft.

The shaft cannot be removed without first detaching one of the removable panels.

The chain from well passes around the shaft E, and with its buckets is kept in motion by said shaft.

The spout D connects with the pipe which elevates the water for the purpose of carrying it away as fast as received.

Having thus fully described my invention, what I claim as new, and desire to secure by Letters Patent, is—

A closed well-curb having openings at opposite sides, in combination with removable panels adapted to fit in and close the said openings, the shaft-thimbles secured in said panels, and the shaft having bearings in said thimbles, the whole arranged substantially as specified.

In testimony whereof I affix my signature in presence of two witnesses.

OTTO JUNKERMAN.

Witnesses:
AUGUST CONRADY,
BURKHART PFEIFFER.